G. G. LEMONS.
MEANS FOR RAISING SUNKEN VESSELS.
APPLICATION FILED AUG. 31, 1918.

1,296,824.

Patented Mar. 11, 1919.
5 SHEETS—SHEET 1.

Witnesses

Inventor
G. G. Lemons
By Victor J. Evans
Attorney

G. G. LEMONS.
MEANS FOR RAISING SUNKEN VESSELS.
APPLICATION FILED AUG. 31, 1918.

1,296,824.

Patented Mar. 11, 1919.
5 SHEETS—SHEET 3.

Witnesses

Inventor
G. G. Lemons
By Victor J. Evans
Attorney

G. G. LEMONS.
MEANS FOR RAISING SUNKEN VESSELS.
APPLICATION FILED AUG. 31, 1918.

1,296,824.

Patented Mar. 11, 1919.
5 SHEETS—SHEET 4.

Witnesses

Inventor
G. G. Lemons
By Victor J. Evans
Attorney

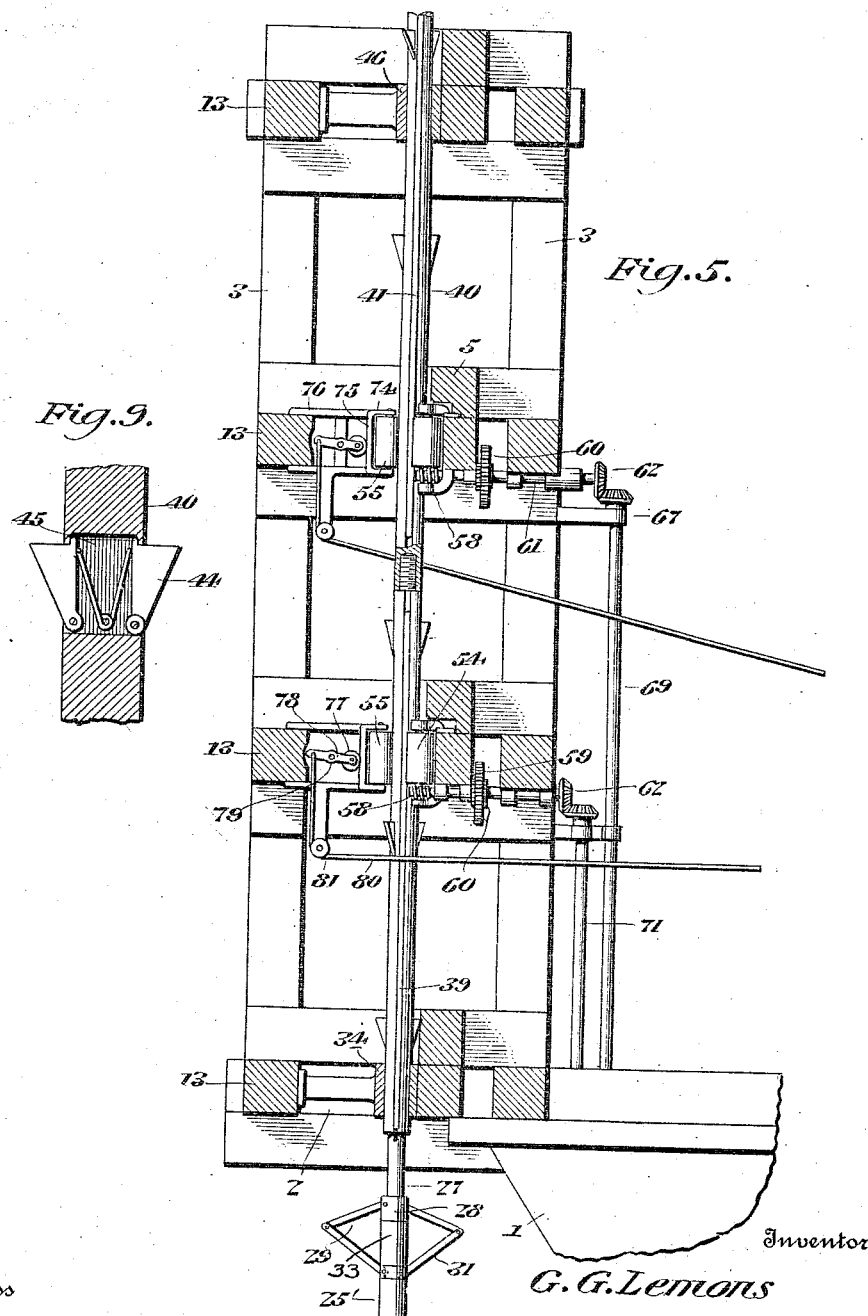

UNITED STATES PATENT OFFICE.

GEORGE G. LEMONS, OF PRESCOTT, ARIZONA.

MEANS FOR RAISING SUNKEN VESSELS.

1,296,824.      Specification of Letters Patent.      Patented Mar. 11, 1919.

Application filed August 31, 1918. Serial No. 252,166.

*To all whom it may concern:*

Be it known that I, GEORGE G. LEMONS, a citizen of Great Britain, residing at Prescott, in the county of Yavapai and State of Arizona, have invented new and useful Improvements in Means for Raising Sunken Vessels, of which the following is a specification.

This invention relates to a means for rotating and raising sunken vessels.

The primary object of the invention is to produce a device of this character in the nature of a drill, operative from the surface of the water to penetrate and secure itself to vessels sunk in such a depth of water that renders it impractical or impossible for divers to descend to attach to the vessel means for elevating the same.

It is a further object of the invention to provide an improved device of this character comprising a drill constructed in sections whereby the same may be lowered to any desired depth in the water, the said drill being arranged on and operated from a boat, scow or other support near the surface of the water and being so connected with such support as to permit of the separation therefrom, leaving the drill in vertical position after the same has penetrated and has attached itself to a sunken vessel, whereby any desired number of drills may be thus attached to the vessel and also whereby suitable elevating means may be attached to the said drills for raising the vessel, or whereby the drills projecting above the surface of the water will indicate the location of the sunken vessel.

Various other objects and advantages of the improvement will present themselves as the nature of the invention is better understood, reference being had to the accompanying drawings in which there is illustrated a satisfactory embodiment of the improvement as it now appears to me. The nature of the improvement is such that the same is necessarily susceptible to a wide scope of modifications, all of which, fall within the scope of what is claimed.

In the drawings:—

Fig. 5 is a sectional view approximately on the line 5—5 of Fig. 3, the drill being elevated;

Fig. 7 is a greatly enlarged elevation of the lower end of the drill, the anchoring means being shown in its closed position;

Fig. 8 is a detail sectional view showing the locking and releasing means for the anchor.

Fig. 9 is an enlarged detail sectional view through the drill in a line with the wings that are attached thereto.

Figure 1:
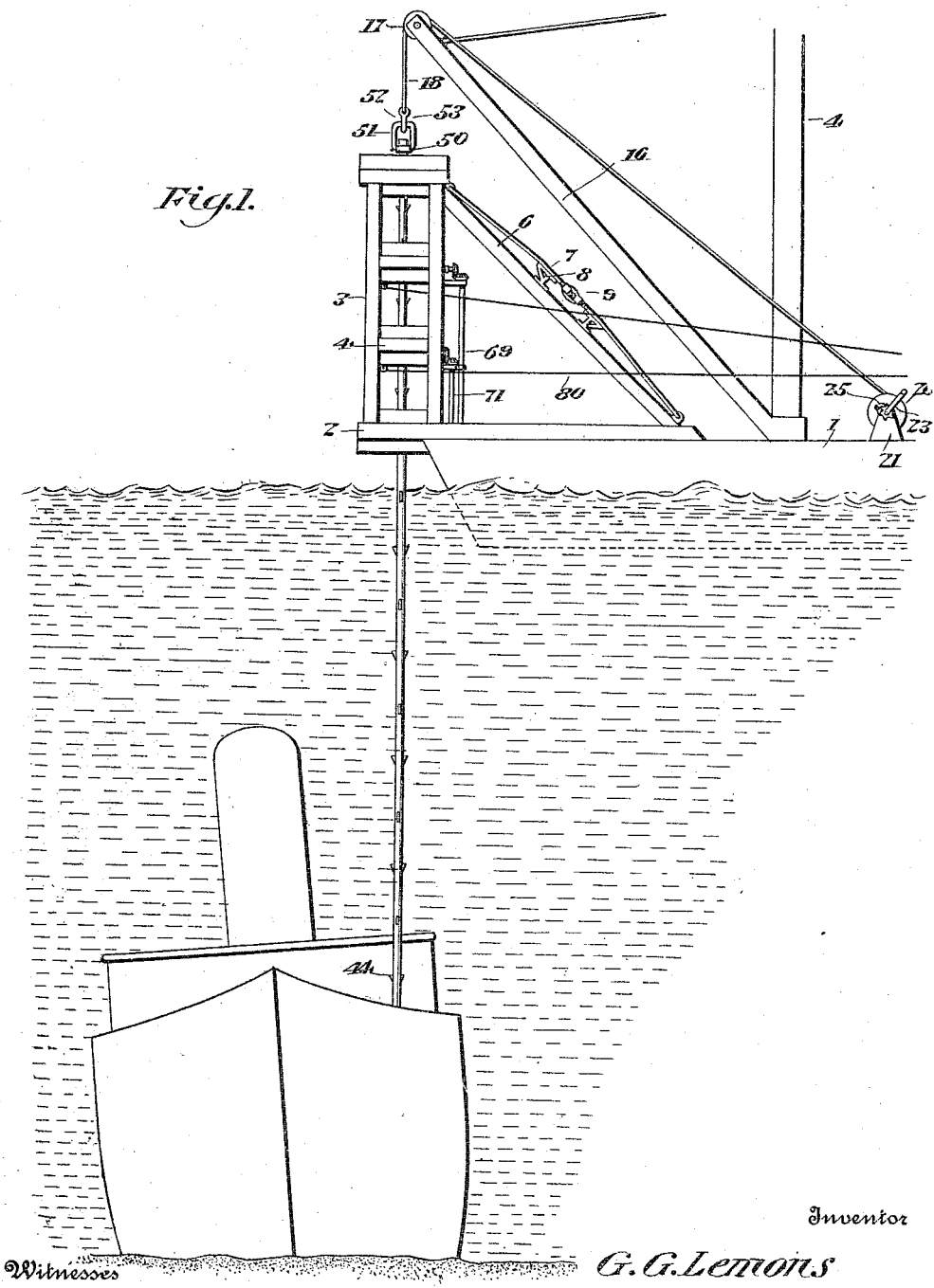
Figure 1 is a view illustrating the manner in which the device may be operated from a boat or other means floating on the surface of the water, showing the drill in attached position upon a sunken vessel.
Figure 2:
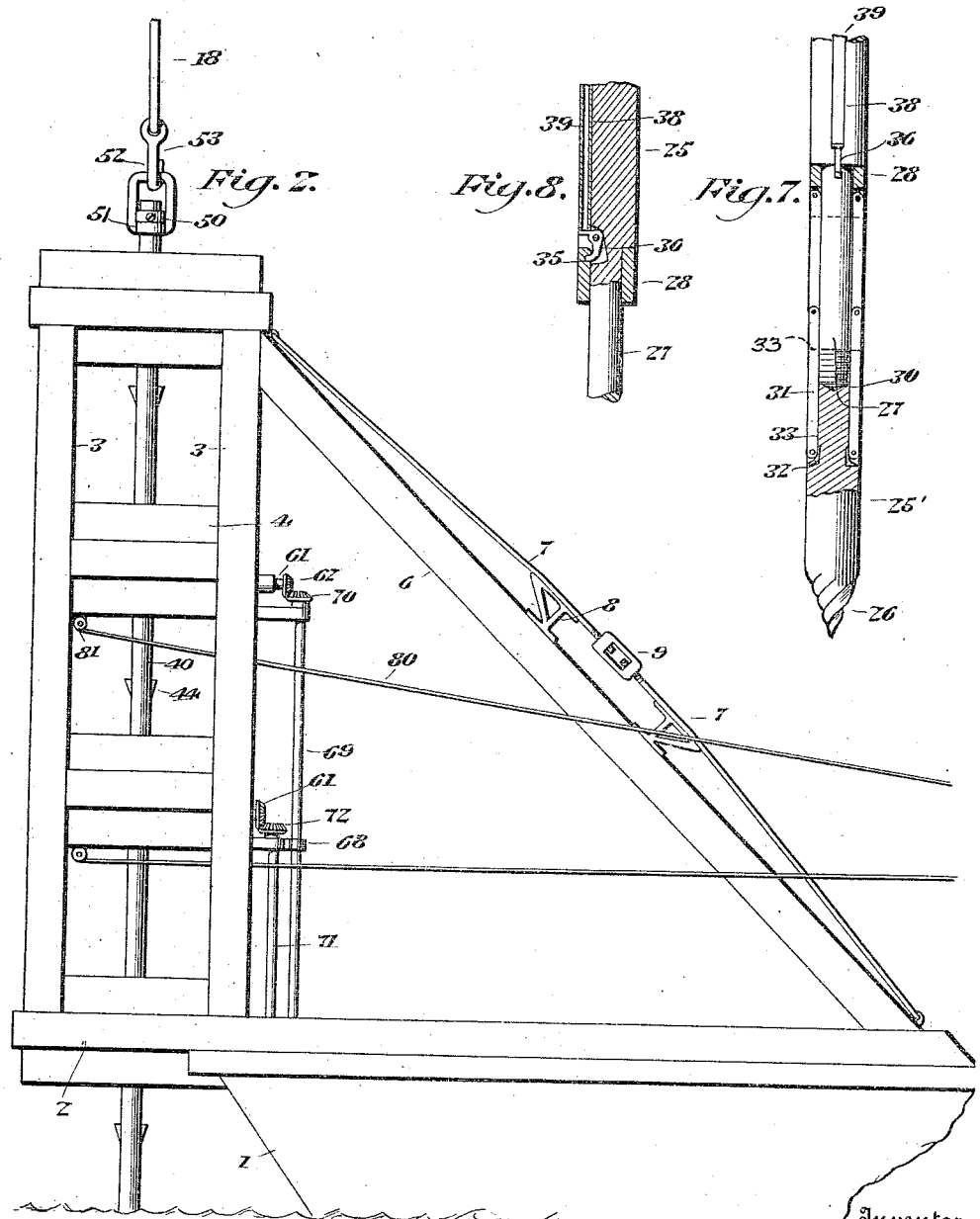
Fig. 2 is a side elevation of the improvement upon an enlarged scale.
Figure 3:
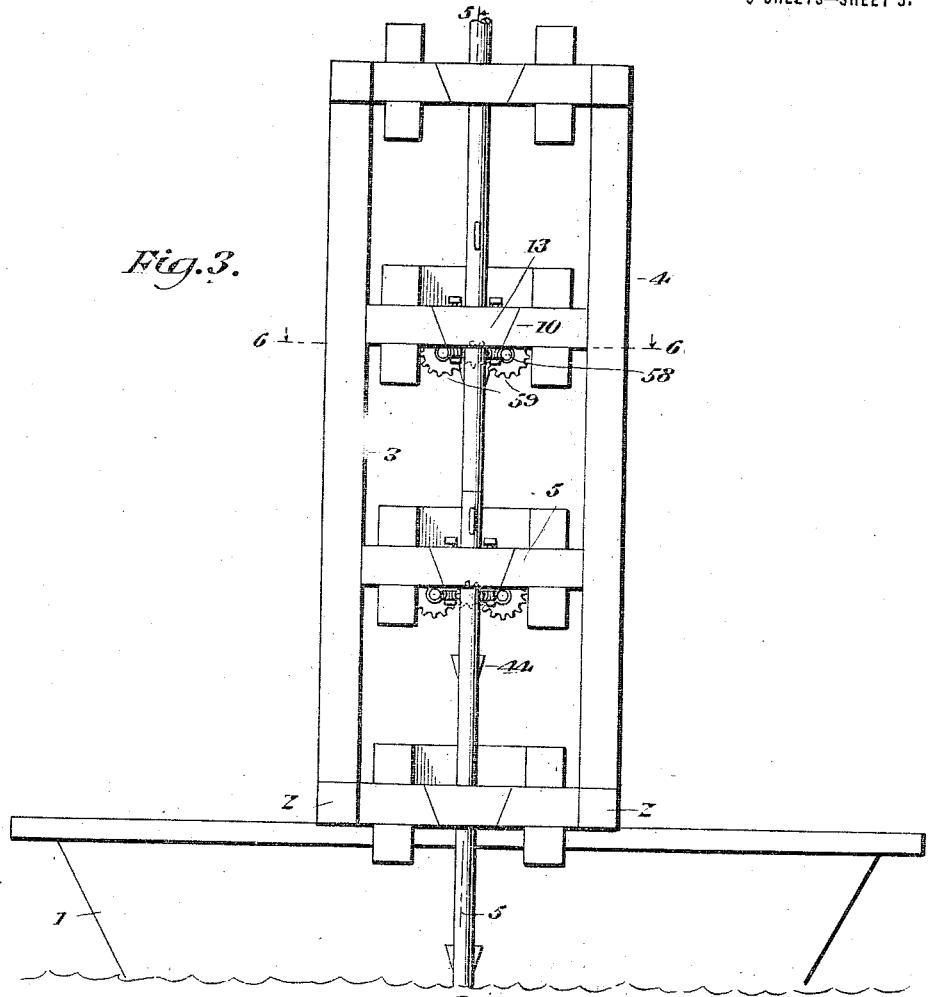
Fig. 3 is a front elevation of the same.
Figure 6:
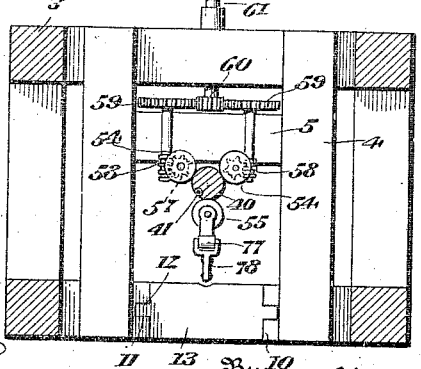
Fig. 6 is a horizontal sectional view approximately on the line 6—6 of Fig. 3.
Figure 4:
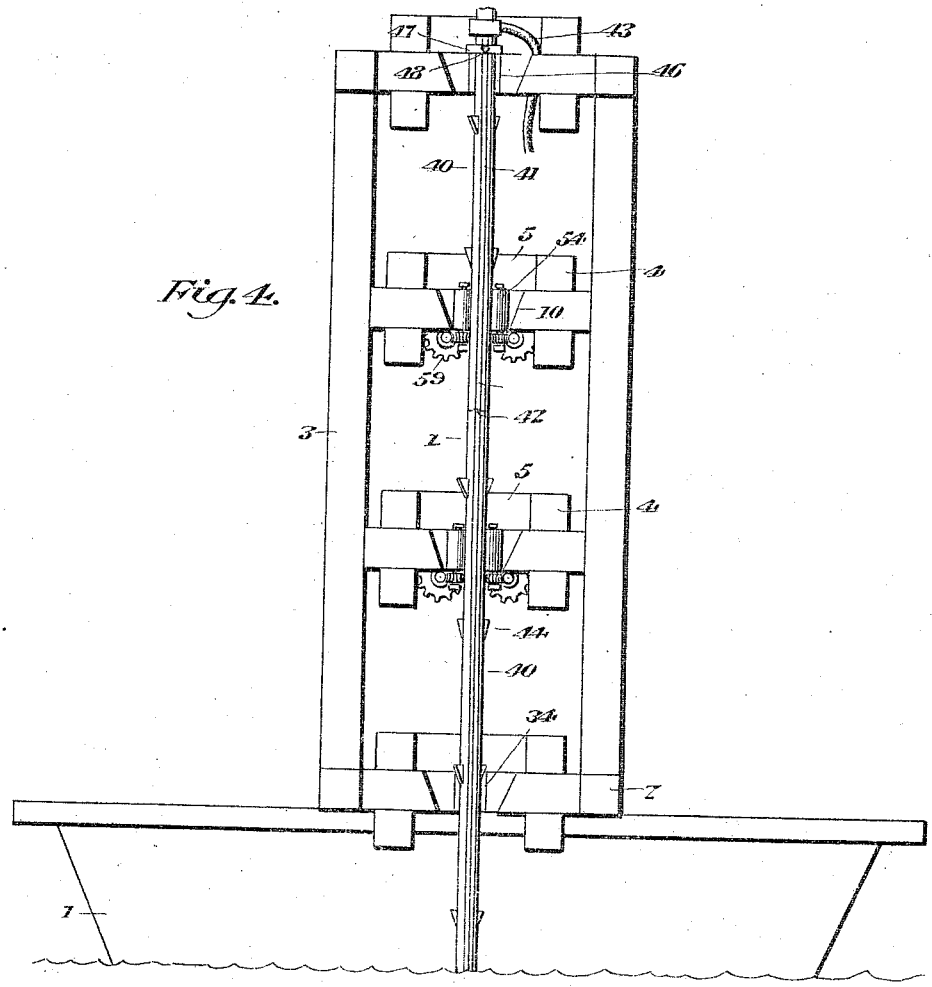
Fig. 4 is a view similar to Fig. 3, but showing the parts removed to permit of the separation of the drill from the support.
Figure 10:
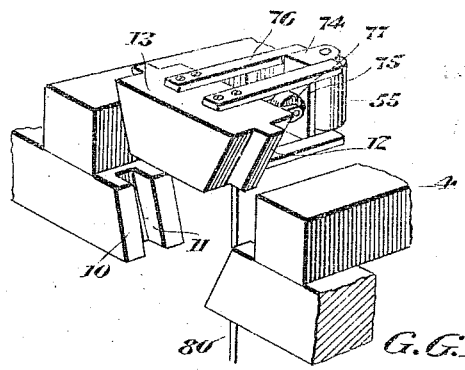
Fig. 10 is a detail perspective view illustrating the manner of removing one of the blocks from the front of the drill guide to permit of the separation of the support from the drill, after the latter has been attached to the sunken vessel.

The improvement is supported from an ocean going scow or other suitable vessel which, in the drawings, is indicated by the numeral 1. Secured to the flat deck of the floating support 1 and projecting therebeyond are parallel beams 2 which form the base for the guide or cage of the drill. Arising from the beams or plates 2 are spaced vertical beams 3—3, the outer beams being secured adjacent to the outer ends of the plates 2, and consequently being arranged outwardly of the floating support or scow 1.

The beams 3, at desired intervals are connected by bars or plates 4 respectively. The connecting bars 4, in the showing of the drawing are arranged one series at the bottom, one at the top and two intermediate of the ends of the corner beams 3 for the cage. These connecting plates may be braced by transverse plates 5, as disclosed by the drawings, and the rear of the cage is braced by an angle beam 6 secured to the plates 2 and to the upper portion of the cage. The brace beams are reinforced by truss bars 7 secured adjacent to the top and bottom of the said beams 6 and contacting with brackets 8 arranged upon the outer faces of the beams 6. The ends of the rods are threaded in opposite directions in the usual manner and the said threaded ends are engaged by a turn buckle 9. The outer connecting plates for the corner plates of the cage are centrally cut away at opposite angles, the said angles being arranged inwardly from the top to the bottom of the said plates, as indicated by the numerals 10, and these angular portions are provided with dove-tailed depressions 11 which receive therein dove-tailed tongues 12 provided upon the angle ends of filler blocks or plates 13. The blocks are thus rendered removable and while the weight thereof normally sustains the same in proper position upon the said outer plates or timbers 4 any desired or preferred means may be employed, if desired, for locking the same to the beams. The cross plates 5 effectively support the central cut away outer plates 4.

On the scow 1, to the rear of the plates 2 is secured the mast 14 having at its upper end a suitable rigging 15 including a beam 16. On the outer end of the beam is swiveled or otherwise connected a sheave 17 through which is passed a cable 18, the said cable being trained around the grooved wheel in the sheave 19 that is connected at the top of the mast 14 and being wound around a suitable drum 20 that is journaled in suitable supports 21 on the deck of the scow 1. The shaft 22 for the drum has its end provided with a crank handle 23 and is also provided with a ratchet wheel 24 which is engaged by a dog 25 to hold the drum against accidental turning.

The drill is constructed in sections, any desired number being employed in accordance with the depth at which the drill is to be sunk. Each of the sections is of a similar size, being all round in cross section, and the upper end of one of the sections is provided with the usual threaded bore to receive the threaded stem on the lower end of the co-acting section. This is true in all instances except in the lower section of the drill, which, for distinction is indicated by the numeral 25' and this section has its lower end formed with a screw or twisted extension 26 that is in the nature of an augur and that is designed, when brought against the plates of a sunken vessel, to bore therethrough to cause the end of the drill to enter the vessel.

The drill section 25, adjacent the outer end 26 thereof is provided with a reduced portion 27. On this portion is slidably arranged a collar 28. To the collar 28, at diametrically opposite points are pivotally connected links 29. These links are adapted to be received in longitudinal notches 30 in the opposite sides of the said collar 28. The links 29 have their outer ends pivotally connected to arms 31, and these arms have their inner faces pivotally connected to a collar 32 that is also arranged upon the reduced portion 27 of the drill 25. The collar 28 is slidable on the reduced portion 27 of the drill, but is limited in its downward movement by contacting with a flange 33 that is secured on the said portion 27 of the drill, and if desired a flange or other securing means may be provided for holding the collar 32 against upward movement on the drill. The flange 33, it is to be understood, is notched whereby to receive the arms 31 when the said arms are folded against the sides of the drill. The arms and the links are of a thickness not greater than the distance between the sides of the reduced portion 27 and the sides of the drill proper, so that the end of the drill provided with these elements may freely pass through a guide sleeve 34 provided in a plate or beam secured between the base plates 2. On the collar 27 is arranged a keeper 35 that is adapted to be engaged by a latch 36 disposed in the space provided between the shoulder 37 of the drill and the reduced portion 27 thereof. The drill upward of the shoulder 37 is provided with a longitudinal groove 38, and in this groove is arranged a fluid pipe 39, which, however, does not extend outward of the groove and may, if desired, have its outer portion rounded to correspond with the round cross sectional contour of the drill. The drill sections other than the lower section just described, and which are indicated by the numerals 40 are provided with similar pipe members 41 having suitable coupling means 42 therebetween. To the uppermost pipe 41 is secured a flexible hose 43, and this hose is directed to the engine room of the scow 1 (not shown). The hose may be connected directly to the boiler in the engine room or to an exhaust therefrom, so that when steam is let through the hose and passed through the pipes 41 and 39, the catch 37 will be actuated to release the sleeve 29, to permit the latter, by virtue of the weight thereof to gravitate downwardly of the drill section 25 until the said collar contacts with the flange 33. This will spread the links 29 and the arms 31, the said links and arms providing the anchoring or retaining means for the drill after the latter has been inserted in a sunken vessel, as will presently be understood.

In addition to the anchors just described all of the drill sections are provided with oppositely opposed pivoted wings 44 that are received in depressions forming pockets therefor, the latter being designated by the numerals 45. The wings 44 are substantially V-shaped in plan and have their lower corners pivoted in the pockets 45, the said wings, when in their spread position, contacting with the lower walls of the pockets to limit the outward swinging thereof, and when in their closed position having their outer edges flush with the outer surface of the drill stem. By this arrangement the wings will fold, when passing through the guide 34 and will open after passing through the said guide.

On the top of the cage between the plates 4 is secured an additional plate having an opening therein receiving a bearing sleeve 46 that is arranged in a line with the bearing sleeve 34. On the upper section of the drill stem is a collar 47 that is adjustably attached to said section, as for instance by the employment of set screws 48. This collar is adapted to limit the downward movement of the drill through the cage therefor and is designed to be arranged upon the successive sections of the drill, when a number of sections are employed. Removably attached to each of the upper sections, as for instance through the medium of binding screws 49 is the lower member 50 of a swivel 51, the latter carrying a bail 52 which is engaged by a hook 53 on the outer end of the cable 18.

It is to be understood that the weight of the drill is sufficient to cause the same to move in a downward direction without other influence and that the cable 18 must be payed out by the operator of the crank 23 to regulate the descent of the drill. When the collar 27 contacts with the drill 46 or with the top of the cage the swivel 51 is removed and another section is attached to the first drill section. The swivel member is then connected to the uppermost section, the cable being wound around the drum to permit of the hook 53 engaging with the bail 52 which is now secured upon the uppermost section. In a like manner the collar 47 is moved upwardly of the upper drill section and disposed a slight distance away from the swivel, so that the drill may be thus enlarged and lowered to a greater depth in the water. This is continued until the drill forcibly contacts with the sunken vessel and enters the same. As the pointed end of the drill contacts with the sunken vessel, the operator is made aware of this fact by the concussion thus occasioned, and after the drill has moved downwardly a sufficient distance to penetrate the sides or plates of the vessel the steam or air fluid controlled valve is actuated to permit of the fluid to pass through the hose 43, pipes 40 and 39 to actuate the catch 37 and release the anchor member. This holds the drill in the vessel. In addition to this the wings 41 will automatically spread to their open position after entering the vessel, so that the pointed end and the anchor of the drill may pass entirely through the vessel and the anchor only opened after the drill is thus positioned.

In order to cause the screw end of the drill to bore through the vessel it is necessary that the drill stem be revolved. To accomplish this, as well as to provide a more efficient guide for the drill than that afforded by the sleeves 34 and 46, I provide roller members 54—54 and 55 respectively.

The roller members 54 are arranged inwardly of the cage and contact with the inner side of the drill stem. The rollers 55 are arranged centrally between the rollers 54 and contact with the outer surface of the drill.

The rollers 54 have their ends provided with trunnions 56 preferably on the cross plates 5. It will thus be noted that an upper and lower series of rollers are provided. The trunnions 56 for the rollers 54, or if desired the lower ends of the said rollers, have peripheral teeth 57 that are engaged by the teeth of screws 58 centrally secured on the outer faces of toothed wheels 59 respectively, the said toothed wheels having their shafts journaled in suitable openings in bearing members on the cage. Between the toothed wheels 59, and intermeshing therewith are pinions 60. These pinions have their shafts 61, journaled in suitable bearings between the inner corner posts or beams 3 of the cage, and upon the inner ends of each of the said shafts 61 is keyed or otherwise secured a beveled toothed wheel 62 respectively. On the inner vertical beams 3 of the cage is secured bearings 67 and 68 respectively and through the bearings 68 passes a vertical shaft 69 that has its outer end provided with a beveled toothed wheel 70 that meshes with the upper beveled toothed wheel 66 of the shaft 61. The lower bearings 68 receive a shorter shaft 71 that has its outer end provided with a beveled toothed wheel 72 that meshes with the toothed wheel 66 on the lower shaft 61. Both of these shafts 69 and 71 receive independent motion from a suitable drive means operated by the engine of the scow and connected to the said shafts, such means being diagrammatically indicated by the dotted lines in Fig. 1 of the drawings. The outer rollers 55 have their trunnions 73 journaled in bearings in the parallel arms 74 of substantially U-shaped brackets 75. These brackets are arranged for sliding movement in suitable guides 76 provided on the cage, and the brackets are adapted to be contacted by anti-frictional rollers 77 journaled upon the inner and preferably bifurcated ends of levers 78 which are pivoted, as at 79 between the guides 76. The pivot is arranged off of the center of the lever, and the outer end of each of the levers has connected thereto a flexible element, such as a cable 80, each of the latter being trained around suitable guide pulleys 81 in the cage and guide pulleys 82 arranged upon the inner face of the cage and directed vertically and downwardly over similar pulleys, illustrated in dotted lines in Fig. 1 of the drawings to the engine room of the scow 1. The ends of the cables 80 may be wound around suitable drums that are controlled by a pawl and ratchet engagement, so that the force of contact of the outer pulleys 55 with the drill stem may be thus regulated.

As previously stated, the weight of the drill is sufficient to cause the downward movement thereof. The rollers 56 are revolved both in the same direction. The rollers 55 force the drill stem into contact with the rollers 56. The rollers 56 provide the power elements for revolving the drill, the rollers 55 providing both a guide and friction means between the drill and the rollers 56. The anchor is normally, as previously stated, retained in its pocket in the drill stem. The wings, however, are normal in their spread condition. The wings, when contacted by the rollers will fold and be retained in their pockets until after the drill descends sufficiently to permit of the rollers again gravitating out of their pockets. The idea of having independent operating means for the upper and lower series of rollers permits of the lower drill section being revolved while an additional section is being attached thereto, in which instance the power for the shaft 69 is cut off.

In relatively deep bodies of water the water pressure is augmented in a very rapidly increasing ratio according to the depth. In such waters it is impossible to use diving apparatus for permitting living beings to descend beneath the surface thereof. With my improvement it will be seen that the necessity of risking human life is entirely overcome. When one of the drills has been lowered to penetrate the sunken vessel, the filler blocks 13 are removed, carrying therewith the friction rollers 55 and the guides therefor. The cables 80 are sufficiently slacked to permit of the blocks and the elements carried thereby being arranged upon the deck of the scow. The scow may be then backed away from the drill. The blocks may be replaced and another drill may be arranged through the cage and operated upon to again penetrate the sunken vessel at a different point from that engaged by the first drill. Thus any desired number of drills may be forced into the vessel. The scow may have arranged thereon means to engage with the drills for raising the vessel, or the scow, after performing its work in securing the drills to the sunken vessel and thus marking the place at which the vessel is sunken may leave the spot and tugs or similar vessels provided with suitable equipments may engage with the drills to elevate the vessel, or pontoons may be sunk at each side of the drills so that the same can be thus fastened to the sunken vessel, and in this manner the vessel may be raised and drifted or conveyed to shore.

Having thus described the invention, what is claimed is:—

1. The combination of a drill having a screw at the lower end thereof, a pivoted anchor normally retained in a pocket in the drill, a catch normally engaging said anchor for retaining the same in the pocket, a fluid conducting pipe opposite the catch, means for permitting a flow of fluid from said pipe to actuate said catch to release the anchor, means for revolving the drill, and suspending means for the drill.

2. The combination of a drill having a screw at the lower end thereof, a pivoted anchor normally retained in a pocket in the drill, gravity influenced wings pivotally secured to the drill above the anchor, latching means for the anchor, releasing means for said latching means, guide means for the drill, means for revolving the drill comprising rollers and operating means therefor, means for regulating the contacting engagement of certain of said rollers with said drill, and suspending means for said drill.

3. The combination of a drill having a screw on the lower end thereof, a cage through which the drill gravitates, guide means on the cage for the drill, suspending means above the cage for the drill, adjustable retaining means for said suspending means, rollers in the cage contacting with the drill, means for revolving certain of said rollers, and means for adjusting the contact of the remaining rollers with the drill.

4. The combination of a drill having a screw at the lower end thereof, a pivoted anchor normally retained in a pocket in the drill, releasing means for said anchor, a cage through which the drill is gravitationally guided, suspending means for the drill above the cage, adjustable supporting means for said suspending means, means comprising rollers in the cage for revolving the drill, means for revolving certain of said rollers, and means for regulating the frictional contact of the rollers with the drill.

5. The combination of a drill comprising a plurality of connected sections, a screw on the outer end of the lower section, a pivoted anchor normally retained in a pocket in said lower section, latching means therefor, releasing means for said latching means, gravity influenced pivoted wings on all of the sections, said sections having pockets to receive the wings when the latter are contacted, and the lower walls of said pockets serving as stops for limiting the outward movement of the wings with respect to the sections, guide means for the drill, means for revolving the drill, and flexible suspending means for the drill.

6. The combination of a drill having a screw on the lower end thereof, a pivoted anchor normally retained in a pocket in the drill, latching means therefor, releasing means for said latching means, a cage through which the drill gravitates, suspending means for the drill for regulating the gravitation thereof, rollers carried by the cage contacting with the drill for revolving said drill, means for turning certain of said rollers, means for adjusting other of said rollers with respect to the drill, whereby to force the drill against the rotatable rollers, and removable means arranged upon the cage whereby to permit of the separation of the drill from the cage.

7. The combination of a drill comprising a plurality of sections having a screw on the lower end thereof, a pivoted anchor normally retained in a pocket in the drill, latching means therefor, releasing means for said latching means, a cage through which the drill is gravitationally guided, suspending means above the cage for the drill, adjusting means for said suspending means, said cage having a removable front whereby the same may be moved away from engagement with the drill, means, comprising rollers, carried by the drill for rotating the latter, said rotating means comprising an upper and lower series of rollers, and independent means for actuating each of said series of rollers.

8. In a device for the purpose set forth, a floating body, plates secured to the deck thereof and projecting thereover, a cage having a removable front on the outer ends of said plates, brace members between the support and cage, a gravity influenced drill comprising a plurality of connected sections guided centrally in the cage, a screw on the lower end of said drill, a pivoted anchor for the drill normally received in a pocket therein, latching means for said anchor, releasing means for said latching means, pivoted wings normally retained at an outward angle with respect to the drill adapted to be brought inwardly of the drill when contacted from the lower or outer edges thereof, means adjustable on the drill contacting with the top of the cage for limiting the downward movement of the drill through the cage, a removable swivel on the upper end of the drill, a mast on the support, a boom thereon, a cable trained through guide pulleys on said boom and removably connected to the swivel, a drum for said cable, actuating and latching means therefor, roller members arranged in series carried by the cage and contacting with the drill, means for regulating the contacting engagement of certain of said rollers with said drill, and independent means for revolving certain of the rollers in each of said series.

In testimony whereof I affix my signature.

GEORGE G. LEMONS.

Copies of this patent may be obtained for five cents each, by addressing the "Commissioner of Patents, Washington, D. C."